| United States Patent [19] | [11] Patent Number: 4,495,939 |
| Arai | [45] Date of Patent: Jan. 29, 1985 |

[54] SOLAR HEAT COLLECTOR WITH JOINT STRUCTURE

[75] Inventor: Nobushige Arai, Nara, Japan

[73] Assignee: Sharp Kabushiki Kaisha, Osaka, Japan

[21] Appl. No.: 440,522

[22] Filed: Nov. 10, 1982

[30] Foreign Application Priority Data

Nov. 10, 1981 [JP] Japan .............................. 56-168169[U]

[51] Int. Cl.³ ................................................ F24J 3/02
[52] U.S. Cl. ..................................... 126/450; 126/441; 126/448
[58] Field of Search ................ 126/450, 441, 448, 443

[56] References Cited

U.S. PATENT DOCUMENTS

| 3,987,783 | 10/1976 | Powell | 126/450 X |
| 4,082,082 | 4/1978 | Harney | 126/448 |
| 4,214,575 | 7/1980 | Hopper | 126/450 |
| 4,227,514 | 10/1980 | Spitzer | 126/448 X |
| 4,228,791 | 10/1980 | Hirai et al. | 126/450 X |
| 4,266,531 | 5/1981 | Behrendt et al. | 126/450 X |
| 4,278,072 | 7/1981 | Ryan et al. | 126/449 |

FOREIGN PATENT DOCUMENTS 2614145 10/1977 Fed. Rep. of Germany ...... 126/450

Primary Examiner—Larry Jones
Attorney, Agent, or Firm—Birch, Stewart, Kolasch & Birch

[57] ABSTRACT

A solar heat collector assembly includes a base carrying one or more heat collectors, a top cover of a "U" shaped configuration and a groove structure for joining the top cover to the base. The top cover in its preferred form is made of plastic material having a number of air cavities serving as heat insulators and the base is made of a heat insulating material, so that the heat collectors on the base are completely environed within a heat insulating chamber for good and efficient heat collection. Furthermore, the groove structure is designed to inhibit ingress of water into the groove structure and prevent ingress of water into the heat collectors in the event that water enters into the groove structure. A typical shape of the groove members is an "S" shape having an upward groove and a downward groove.

14 Claims, 8 Drawing Figures

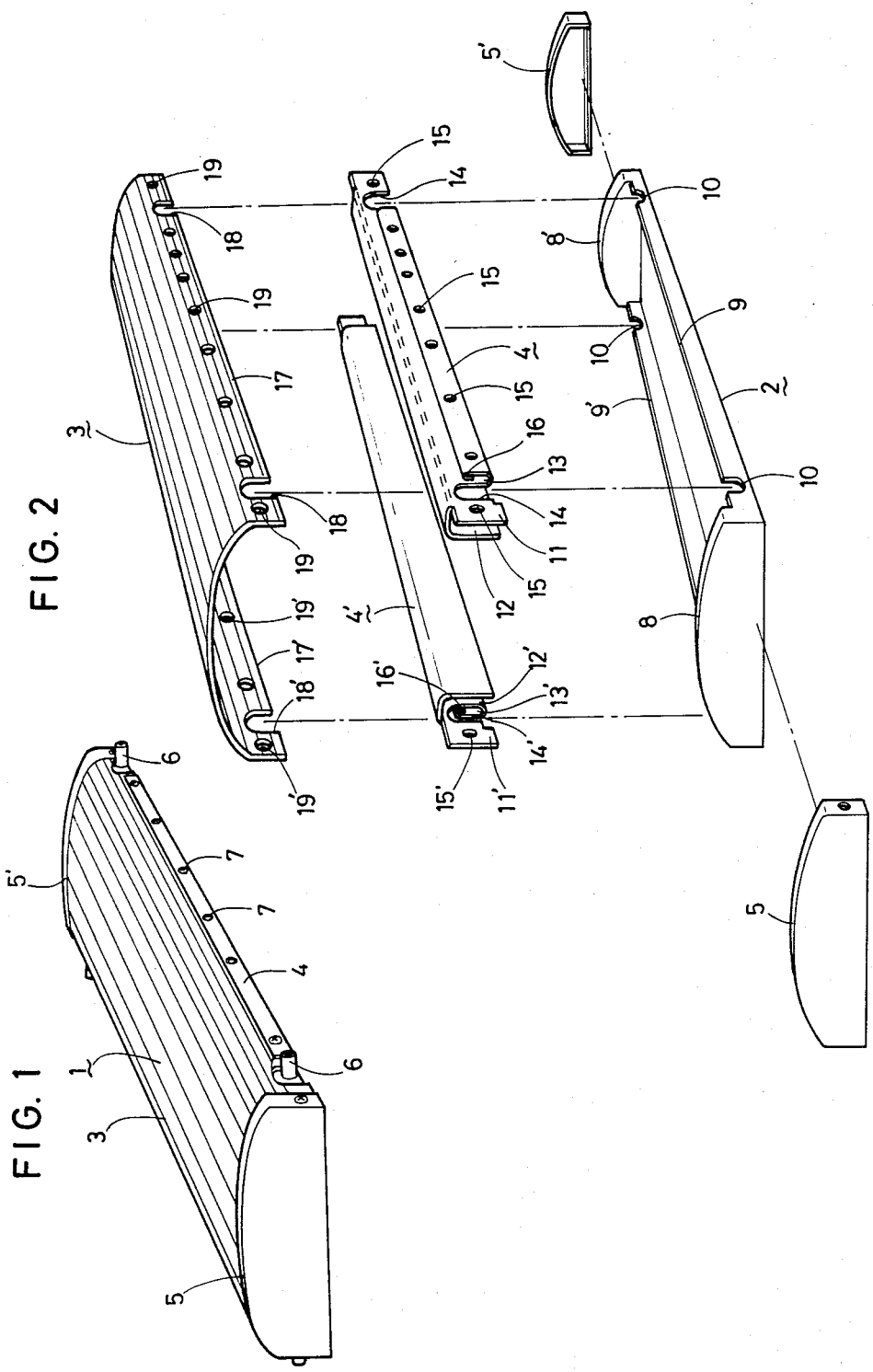

4,495,939

SOLAR HEAT COLLECTOR WITH JOINT STRUCTURE

BACKGROUND OF THE INVENTION

This invention relates to a solar heat collector assembly and more particularly to an improvement in a solar heat collector assembly.

A conventional type of solar heat collector assembly is adapted such that a top cover is made in the form of a flat plate in order to reduce heat loss of the solar heat collector to a minimum and is tightly secured with a hermetic seal by means of a metallic frame. The above type of solar heat collector assembly is however deficient in that it suffers from difficulties of assembling, low reliability of the hermetic seal, high possibility of water ingress, and decline in the efficiency of heat collection, etc.

OBJECTS AND SUMMARY OF THE INVENTION

Accordingly, it is an object of the present invention to provide an improved solar heat collector assembly which overcomes the above problems with the prior art device.

It is another object of the present invention to provide an improved solar heat collector assembly which is simple in cover-to-base joint structure, light in weight, excellent in hermetic seal performance and load-deformation resistance.

To achieve the foregoing objects, the present invention is a solar heat collector assembly which comprises a base carrying one or more heat collectors, a top cover of a "U" shaped configuration and a groove structure for joining the top cover to the base. With such arrangement, the top cover is tightly secured in conjunction with the base with less expenditures and higher joint strength of. The top cover in its preferred form is made of plastic material having a number of air cavities serving as heat insulators and the base is made of a heat insulating material, so that the heat collectors on the base are completely environed within a heat insulating chamber for good and efficient heat collection. Furthermore, the groove structure is designed to inhibit ingress of water into the groove structure and prevent ingress of water into the heat collectors in the event that water enters into the groove structure.

In a preferred form of the present invention, the groove structure includes a pair of groove members each having two grooves including an upward-oriented outside groove and a downward-oriented inside groove. Two side walls of the base carrying the heat collectors are received within the downward-oriented inside grooves of the groove members and two side walls of the "U" shaped configuration, which covers an open top surface of the base, are fitted within the upward-oriented outside grooves of the groove members. The top cover is mechanically reinforced with the groove members and a chamber in the base is closely sealed with the groove members.

BRIEF DESCRIPTION OF THE DRAWINGS

For a more complete understanding of the present invention and for further objects and advantages thereof, reference is now made to the following description taken in conjunction with the accompanying drawings, in which:

FIG. 1 is a perspective view of a solar heat collector assembly according an embodiment of the present invention;

FIG. 2 is an exploded perspective view of major components of the solar heat collector assembly;

DETAILED DESCRIPTION OF THE INVENTION

Figure 3:
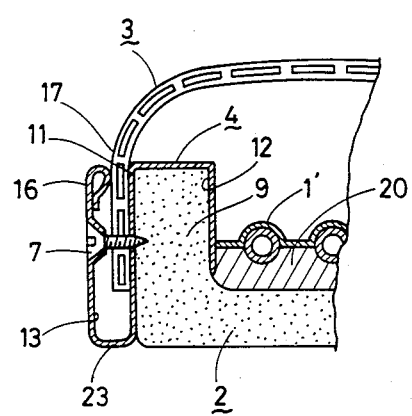
FIG. 3 is a cross sectional view of the solar heat collector assembly.

FIGS. 1 to 3 illustrate a solar heat collector assembly constructed according to an embodiment of the present invention. The solar heat collector assembly 1 generally includes a base 2 of a box-like configuration with an open top surface for accommodating therein one or more heat collector plates 1' of a known structure (as shown in FIG. 3), an inverted "U" shaped top cover 3 of proper plastic material provided for ensuring efficient collection of solar heat and minimization of heat loss to the surrounding atmosphere, and a pair of groove members 4 and 4' of an "S" shaped transverse cross section for joining the top cover 3 to the base 1.

There are further provided a pair of box-like end covers 5 and 5' fitted at the left and right ends of the collector assembly 1, header pipes 6 for water conduits within the heat collectors and fasteners 7.

The base 2 is made of a proper heat insulating material, preferably, such foamed plastic material as foamed polystyrene resin, foamed ABS resin, foamed polyurethane resin and foamed polyester resin to moderate expansion and contraction due to temperature variance and reduce the weight of the whole assembly. The left and right walls 8 and 8' of the base are similar in shape to the top cover 3 of the inverse "U" cross section so that they are maintained in close contact with the left and right inside edges of the top cover 3. Formed in the front and back walls 9 and 9' of the base 2 are slots 10 which receive the header pipes 6 leading to the water conduits in the heat collectors.

The two groove members 4 and 4' are to be snugly fitted around the front and back walls 9 and 9' of the base 2 and have the same shape and configuration as these walls. Following is an explanation of the front groove member 4 only for the convenience of illustration. The groove member 4 is a curved member which is defined by a partition 11 of the same length as that of the base 2 and bears substantially an "S" shaped transverse cross section having a downward-oriented inside groove 12 and an upward-oriented outside groove 13. In addition, slots 14 are perforated to align with slots 10 in the base 2 in the neighborhood of the left and right ends of the partition 11. The downward groove 12 has the same length as the distance between the left and right walls 8 and 8' of the base 2, while the upward groove 13 has the same length as the distance between the slots 14. Openings 15 are provided for the fasteners 7. An ear 16 is inwardly directed to prevent ingress of water and is spring biased in pressure contact with the outer surface of the front wall of the top cover.

The top cover 3 has the same length as that of the base 2 and takes the inverse "U" cross section as described above. Preferably, the top cover 3 is an integrally formed plastic member having a number of air cavities each serving as a heat insulator as illustrated in FIG. 3. The top cover 3 is provided at its front and back walls 17 and 17' in the neighborhood of its left and right edges slots 18 which correspond to the slots 10 and 14. Lower portions of the front and back walls 17 and 17' of the top cover 3 are formed with openings 19 to align with those 15 for the fasteners. Following is a way to assemble the base 2, the top cover 3 and the groove members 4 and 4'. The front and back walls 9 and 9' of the base 2 are fitted within the downward grooves 12 and 12' of the respective groove members. The next step is to place the inner surfaces of the left and right edges of the top cover 3 on the left and right walls 8 and 8' of the base 2. The front and back walls 17 and 17' of the top cover are then closely fitted in the outside upward grooves 13 and 13' of the respective groove members. The base 2 and the top cover 3 are joined by means of the fasteners screwed into the openings 15 and 19. Hermetic seal is completed after mounting the edge covers 5 and 5' on the left and right edges of the assembly and fixing the same by means of the fasteners 7. The resulting solar heat collector assembly is illustrated in a perspective view of FIG. 1.

In assembling these shell components, internal components including the heat collectors 1', the header pipes 6, the heat insulator 20, etc. should be held in proper position.

Figure 4:
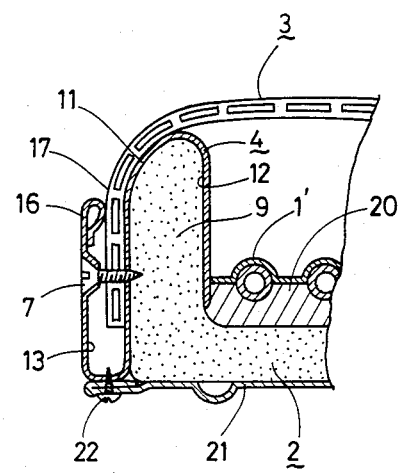
FIG. 4 is a cross sectional view of another embodiment of the present invention.
Figure 5:
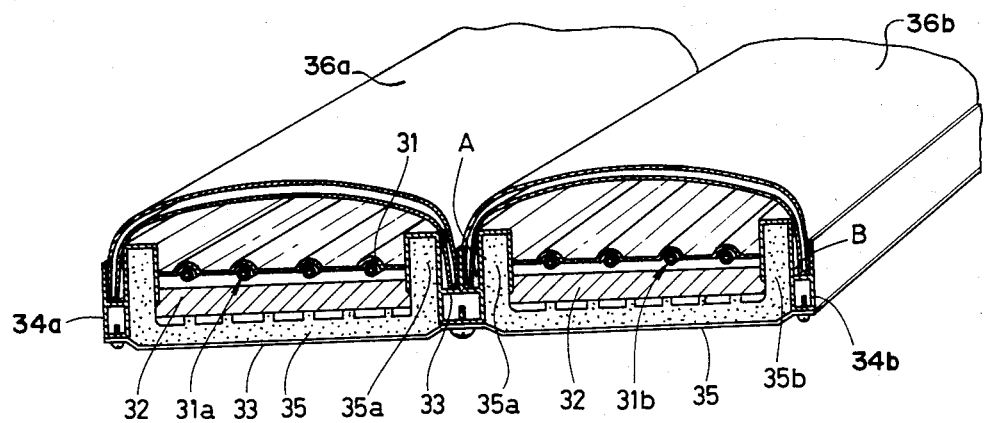
FIG. 5 is a perspective view of still another embodiment of the present invention.

FIG. 4 shows another embodiment wherein an upper portion of the front or back wall of the base 2 has an upward extension of an arch-shaped cross section to assure firm engagement of the groove members and the top cover. A metal bottom plate 21 is additionally provided and secured on the bottom of the base 2 by means of screws 22 inserted into the bottom of the groove member 4, thus enhancing the strength of the entire solar heat collector assembly 1.

It is clear from the foregoing that the solar heat collector assembly including the base 2, the top cover 3 and the groove members 4 and 4' is very easy to assemble and only requires fitting of the front and back walls of the base 2 and the top cover 3 into the inside and outside grooves in the groove members 4 and 4' and fixing the same in the grooves by means of the fasteners such as screws or other known devices. The groove members are "S" curved and have some resiliency and shape retention. Furthermore, since the top cover is closely joined with the base, the side walls of the two components are reinforced with each other. The curved structure of these components provides a complete hermetic seal and prevents leakage of water. In the event that such curved structure fails to prevent ingress of water into the groove members, a channel 23 formed in the groove member permits water to be discharged out of the groove member and prevents water from entering into the base 2.

Figure 7:
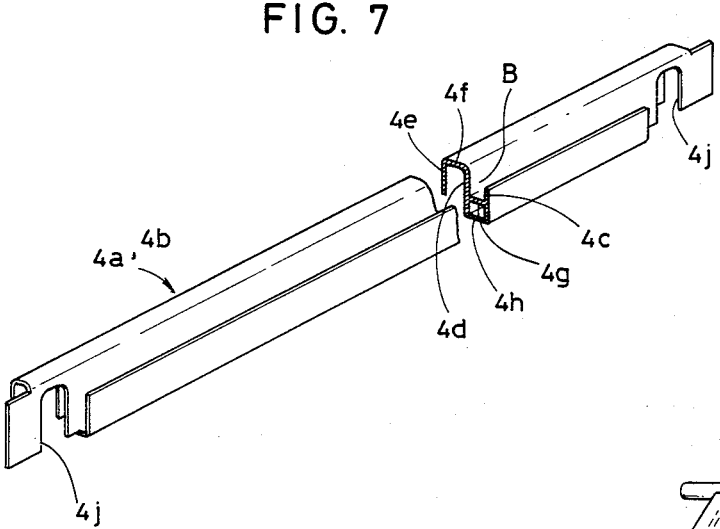
FIG. 7 is a cross sectional perspective view of another example of the groove members used in FIG. 5.
Figure 6:
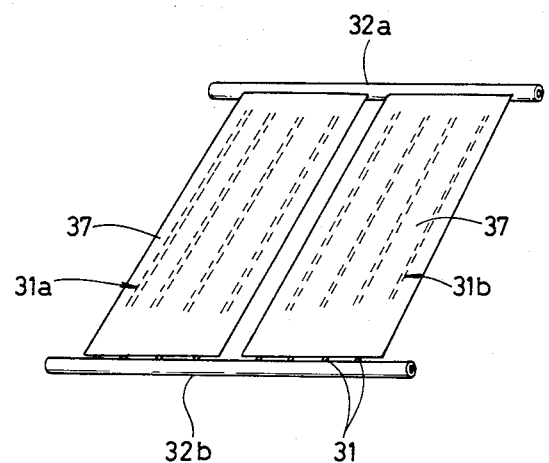
FIG. 6 is a perspective view of a combination of water conduits and header pipes in the embodiment of FIG. 5.
Figure 8:
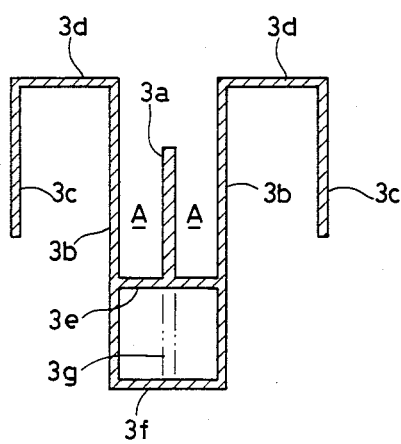
FIG. 8 is a cross sectional view of a joint member.

Still another embodiment of the present invention is illustrated in FIGS. 5 to 8, which includes a pair of solar hear collectors. This alternative embodiment includes a pair of water conduit units 31a and 31b, a pair of header tubes 32a and 32b communicating between the pair of the water conduit units, a joint member 33 disposed intermediate the pair of the water conduit units, a left side groove member 34a of substantially same configuration as discussed above disposed on the left side to the left unit 31a, a right groove member 34b disposed on the right side of the right unit 31b, a heat collection box 35 for joining the joint member 33 and the left and right groove members 34a and 34b, a left top cover 36a having both edges fitted in an edge groove in the left groove member 34a and the joint member 33 and a right top cover 36b having both edges fitted in a groove in the right groove member 34b and one in the joint member 33. As is obvious from the drawings, the groove members are of an "S" shape having upward and downward grooves as in the above illustrated embodiment, while the joint member 33 is of a "W" shape having two upward grooves and two downward grooves. The joint member 33, as indicated in FIG. 8, consists of a center partition 3a, a pair of outside segments 3b, a top segment 3d, a middle segment 3e and a bottom segment 3f and preferably is made of aluminum or hard or reinforced plastic resin. The groove members 34a and 34b, as indicated in FIG. 7, each consists of an outside segment 4c, inside segments 4d and 4e, a top segment 4f, an middle segment 4g and a bottom segment 4h. Preferably, the groove members are an integral block of aluminum or proper hard plastic material. In FIG. 6, the water conduits are designated by 37. It is obvious in the art that a desired number of the pair of the collectors may be connected in series to obtain a larger heat collection area.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A solar heat collector assembly comprising:
   a base having a bottom and a pair of oppositely disposed upstanding sidewalls;
   at least one heat collector disposed on said base;
   a substantially rigid member extending along each said sidewall, each said member comprising at least a first groove opening in a first direction and receiving a respective sidewall therewithin and at least a second groove opening in a second direction;
   a transparent cover having a substantially U-shaped configuration including oppositely disposed side portions, wherein said side portions are spaced at a distance from each other corresponding to a distance between said second grooves of said members and said cover side portions are positioned within said respective second grooves;
   wherein said cover is made of material having air cavities therein serving as heat insulators and said base is made of a heat insulating material, whereby said heat collector is completely enclosed within an insulated chamber.

2. A solar heat collector assembly comprising:
   a base having a bottom and a pair of oppositely disposing upstanding sidewalls;
   at least one heat collector disposed on said base;
   a substantially rigid member extending along each said sidewall, each said member comprising at least a first groove opening in a first direction and receiving a respective sidewall therewithin and at least a second groove opening in a second direction;

a transparent cover having a substantially U-shaped configuration including oppositely disposed side portions, wherein said side portions are spaced at a distance from each other corresponding to a distance between said second grooves of said members and said cover side portions are positioned within said respective second grooves;

means for inhibiting ingress of water into said second groove and means for preventing water which may enter said second groove from entering said collector.

3. The assembly of claim 2, wherein said member comprises a first portion adjacent said second groove, wherein said first portion is pressed against said cover for inhibiting ingress of water into said second groove, said member further comprising means for draining water which may enter said second groove therefrom to the exterior of said assembly.

4. A solar heat collector assembly comprising:
a base having a bottom and a pair of oppositely disposed upstanding sidewalls;
at least one heat collector disposed on said base;
a substantially rigid member extending along each said sidewall, each said member comprising at least a first downward-oriented inside groove receiving a respective sidewall therewithin and at least a second upward-oriented outside groove;
a transparent cover having a substantially U-shaped configuration including oppositely disposed side portions, wherein said side portions are spaced at a distance from each other corresponding to a distance between said second grooves of said members and said cover side portions are positioned within said respective second grooves.

5. A solar heat collector assembly as set forth in claim 4 wherein said side walls of said base are received within said downward-oriented inside grooves of said members and two side portions of said "U" shaped cover are fitted within the upward-oriented outside grooves of said members.

6. A solar heat collector assembly as set forth in claim 4 wherein said members are made of aluminum or plastic material.

7. A solar heat collector assembly as set forth in claim 4 wherein said base consists essentially of foamed plastic material.

8. The assembly of claim 4, further comprising means for securing said side portions of said cover within said second grooves.

9. The assembly of claim 4, wherein said members are substantially coextensive with said sidewalls.

10. The assembly of claim 4, wherein said first and second grooves open in opposite and directions.

11. The assembly of claim 4, wherein said first and second grooves face in substantially opposite directions and are parallel to each other and said side portions of said cover are substantially parallel to said upstanding sidewalls.

12. The assembly of claim 4, wherein each member is S-shaped in cross section defining said first and second grooves.

13. The assembly of claim 4, wherein said base further comprises end walls conforming in contour to said U-shaped of said cover, said assembly further comprising means for assuring sealing contact between said cover and said end walls.

14. The assembly of claim 4 comprising:
a plurality of said bases positioned in juxtaposition to each other with their upstanding sidewalls mutually adjacent each other;
said assembly comprising one of said members positioned between mutually adjacent sidewalls of juxtaposed bases;
each said member positioned between mutually adjacent sidewalls comprising two said first grooves for receiving said respective sidewalls therewithin and two said second grooves for receiving a side portion of a cover associated with said respective bases.

* * * * *